United States Patent [19]

Lewis et al.

[11] Patent Number: 4,918,526
[45] Date of Patent: Apr. 17, 1990

[54] APPARATUS AND METHOD FOR VIDEO SIGNAL IMAGE PROCESSING UNDER CONTROL OF A DATA PROCESSING SYSTEM

[75] Inventors: Richard E. Lewis; John C. Kingsolver, both of Albuquerque, N. Mex.

[73] Assignee: Digital Equipment Corporation, Maynard, Mass.

[21] Appl. No.: 28,404

[22] Filed: Mar. 20, 1987

[51] Int. Cl.⁴ ............................................. H04N 5/14
[52] U.S. Cl. ..................................... 358/160; 358/22; 358/443
[58] Field of Search ................. 358/21 R, 22, 3, 160, 358/182, 183, 260, 280, 111, 426, 443, 444, 488, 450, 451, 452, 453

[56] References Cited

U.S. PATENT DOCUMENTS

| | | | |
|---|---|---|---|
| 4,287,528 | 9/1981 | Levy | 358/146 |
| 4,543,607 | 9/1985 | Taylor et al. | 358/140 |
| 4,647,971 | 3/1987 | Norman | 358/160 |
| 4,661,987 | 4/1987 | Anderson et al. | 358/160 |
| 4,709,393 | 11/1987 | Taylor et al. | 358/22 |
| 4,746,980 | 5/1988 | Petersen | 358/160 |
| 4,758,881 | 7/1988 | Laspada | 358/21 R |
| 4,862,266 | 8/1989 | Gillard | 358/160 |

Primary Examiner—John W. Shepperd
Assistant Examiner—Michael D. Parker
Attorney, Agent, or Firm—William W. Holloway; T. Carter Pledger

[57] ABSTRACT

In order to process video images under control of a data processing system, a video signal processing device is described that can be coupled to a data processing system interface unit. The video signal processing device includes two image frame buffers and apparatus for transferring signals in a controllable manner between the two image frame buffers. The video signal processing device also includes apparatus for combining the output signals of the image frame buffers in a controllable manner. The control of the signal transfer between image frame buffers and the control for the combining of the output signals of the image frame buffers is provided by the data processing system. The data processing system loads a multiplicity of registers with information to provide the desired output signal and the video signal processing unit executes the functions determined by the register contents. In this manner, the data processing system can devote relatively few of the available resources to processing the image.

20 Claims, 7 Drawing Sheets

| 7  | INTERRUPT CONTROL | 0 |
| 15 | VECTOR ADDRESS | 0 |
| 15 | HARDWARE CONFIGURATION | 0 |
| 7  | MASK USAGE | 0 |
| 15 | CURSOR X | 0 |
| 15 | CURSOR Y | 0 |
| 7  | CURSOR CONTROL | 0 |
| 7  | OUTPUT CONTROL | 0 |
| 15 | STATIC OUTPUT ALPHA | 0 |
| 15 | VIDEO OUTPUT ADDRESS | 0 |
| 7  | VIDEO INPUT REGISTER | 0 |
| 15 | INPUT ALPHA | 0 |
| 15 | TRANSFER CONTROL | 0 |
| 7  | TRANSFER CONTROL | 0 |
| 15 | INTERATION START | 0 |
| 15 | SOURCE ADDRESS | 0 |
| 15 | DESTINATION ADDRESS | 0 |

*FIG. 5.*

APPARATUS AND METHOD FOR VIDEO SIGNAL IMAGE PROCESSING UNDER CONTROL OF A DATA PROCESSING SYSTEM

BACKGROUND OF THE INVENTION

1. Field of the Invention

This invention relates generally to the processing of video images and, more particularly, to the processing of digitized video signals under the control of a data processing system.

2. Description of the Related Art

As the sophistication of the general population with respect to visual materials has increased, the need to have available relatively extensive image processing capabilities has increased. For example, the weatherman in front of an apparently full-sized and frequently changing weather map has become so common as to be unremarkable even for the local broadcasting station.

The apparatus for processing video images, especially for processing images in real time, until the present invention, have generally occupied two extremes in image processing capability. On the one extreme, the apparatus has such limited capability as to be of modest use to the broadcasting station in other simple image processing applications. On the other extreme, the apparatus can be of such sophistication that the image processing capabilities are extremely broad. This latter extreme provides all the capability that is required in any typical image environment. However, the capability is achieved by having a data processing unit retrieve and manipulate each image point (generally referred to as a pixel) individually. The amount of data processing system resources that must be dedicated to process an image on a pixel by pixel basis is sufficiently large that the data processing system can be too expensive to be practical for many applications requiring video image processing capability. (For the typical video image format, the image is generally represented by a matrix of 512×512 image pixels, each image pixel being updated approximately 30 times each second. In addition, each image pixel is generally represented by at least four quantities, three color parameters and and an intensity parameter.) Along with the specialized programs needed to execute the video processing functions, a dedicated data processing system is frequently required. To accommodate the specialized nature of the image processing operations, a specialized data processing architecture may also be utilized.

A need has therefore been felt for video image processing apparatus that can provide flexibility for processing of images in real time under control of a data processing system, while minimizing the impact of the video image processing on the data processing system resources.

FEATURES OF THE INVENTION

It is an object of the present invention to provide an improved system for processing video image signals.

It is a feature of the present invention to provide an improved system for processing digitized video image signals.

It is another feature of the present invention to provide apparatus that can process digitized video signal images under control of a data processing system.

It is a more particular feature of the present invention to provide two image frame buffers (i.e., memories) in which apparatus transferring video image signals between the image frame buffers performs the transfer function in a manner to provide certain image processing functions.

It is another particular feature of the present invention to provide apparatus for combining video image signals from each of two frame buffers to provide image processing functions.

SUMMARY OF THE INVENTION

The aforementioned and other features are accomplished, according to the present invention, by providing a video signal processing unit that can be coupled to and controlled by a data processing system. In response to user input signals or stored programs, the data processing system transfers appropriate command and control signals to the video signal processing unit. The video signal processing unit includes two image frame buffer memory units into which digitized input video image signals can be stored. Apparatus is provided for transferring signals between the two image frame buffer memories and, by controlling parameters of the transfer process, the resulting image will have selected image processing operations performed thereon. The video signal processing unit also includes apparatus for combining the output signals from the two image frame buffers in such a manner that additional image processing operations can be performed thereby. Provision is made to permit control signals from the data processing unit to determine the intensity of the image points. In addition, the video input signals and the video output signals are applied to a plurality of look up tables, the look up table entries being controlled by the user data processing system, and these look up tables provide further image processing capability. The resulting video output signal can, as a consequence have several operations preformed thereon.

These and other features of the present invention will be understood upon reading of the following description along with the drawings.

BRIEF DESCRIPTION OF THE DRAWINGS

FIG. 5 illustrates the contents of registers accessible to the data processing system.

DETAILED DESCRIPTION OF THE PREFERRED EMBODIMENT

1. Detailed Description of the Figures

Figure 1:
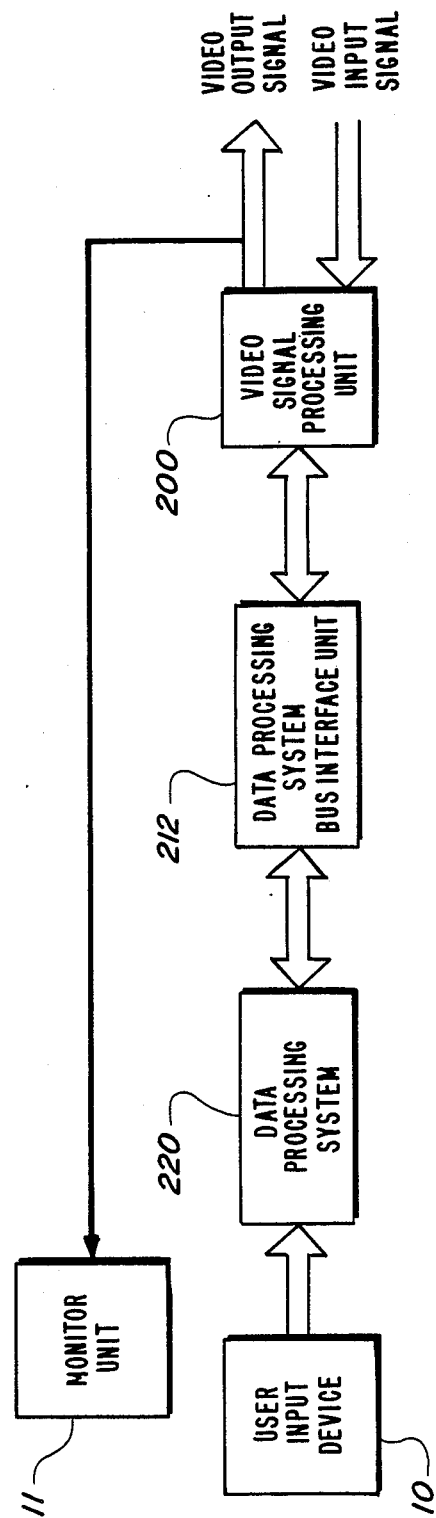
FIG. 1 is a block diagram showing the system with which the present invention is intended to be used.

Referring to FIG. 1, the system in which the present invention is intended to be used is illustrated. A user input device 10 permits a user to control an output image signal based on an input image. For this application, a user input device 10 can be a pad, light pen, tableau, etc. and/or function switches that permit the user to communicate the desired image processing function(s) to the data processing system 220. The user will typically enter these commands while monitoring the video output signal on monitor unit 11. The data processing system 220, by means of an appropriate program, interprets the incoming commands from the user input device 10 and recasts the commands in the form of control signal groups that will perform the desired image processing functions by the capabilities available in the video signal processing unit 200. The control signals are transferred through the data processing system bus interface unit 212 to the video signal processing unit 200. (For non-system bus oriented data processing systems, the video signal processing unit 200 would be coupled to one of the data processing system input/output ports, e.g., located in the memory control unit.) In response to the control signals from the data processing unit 220, the video input signal is processed by the video signal processing unit 200 to provide the video output signal.

Figure 2:
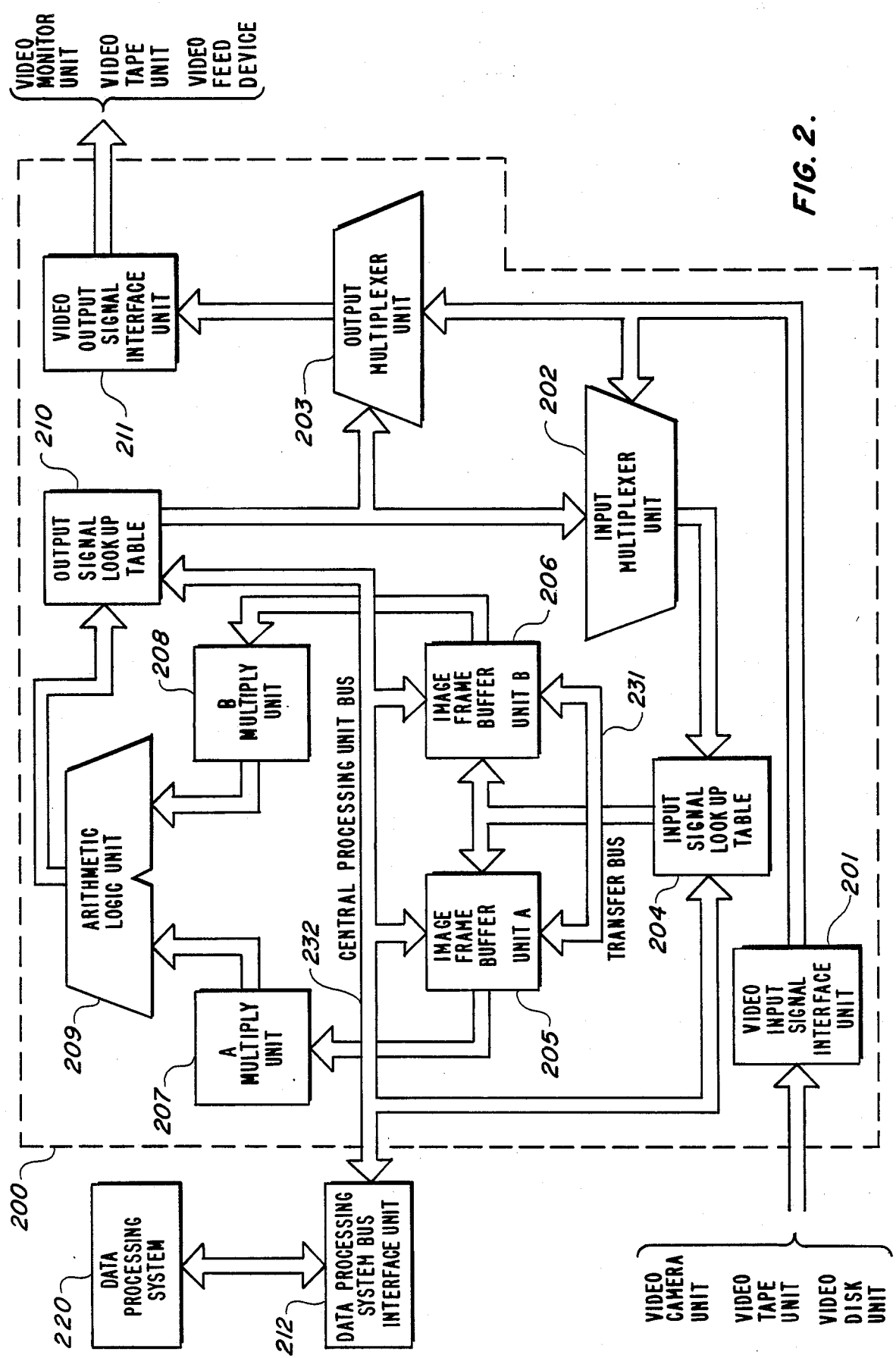
FIG. 2 is a block diagram of the data transfer paths of the image processing system according to the present invention.

Referring next to FIG. 2, the block diagram of the video signal processing unit 200, according to the present invention, is illustrated. Input signals from a video camera unit, a video tape unit, a video disk unit, etc. are applied to video input signal interface unit 201. Output signals from video input signal interface unit 201 are applied to a first set of terminals of input multiplexer unit 202 and to a first set of input terminals of output multiplexer unit 203. The output signals from input multiplexer unit 202 are applied to input signal look up table 204. The output signals from input signal look up table 204 are applied to image frame buffer unit A 205 and to image frame buffer unit B 206. Image frame buffer unit A 205 and image frame buffer unit B 206 are coupled by transfer bus 231. Image frame buffer unit A 205 applies signals to A multiply unit 207, while frame buffer unit B 206 applies signals to B multiply unit 208. A multiply unit 207 applies signals to a first set of input terminals of arithmetic logic unit 209 and B multiply unit 208 applies signals to a second set of input terminals of arithmetic logic unit 209. The output signals from arithmetic logic unit 209 are applied to output signal look up table 210. Signals from output signal look up table 210 are applied to a second set of terminals of output multiplexer unit 203 and to a second set of input terminals of input multiplexer unit 202. The output signal look up table 210, the image frame buffer unit A 205, the image frame buffer unit B 206, the input signal look up table 204 and the data processing system bus interface unit 212 are coupled by central processing unit bus 232. The data processing system bus interface unit 212 is coupled to the data processing system 220. Signals from output multiplexer unit 203 are applied to video output signal interface unit 211. The output signals from the video output signal interface unit 211 are applied to storage or display devices such as video monitor units, video tape units, video feed devices, etc.

Figure 3:
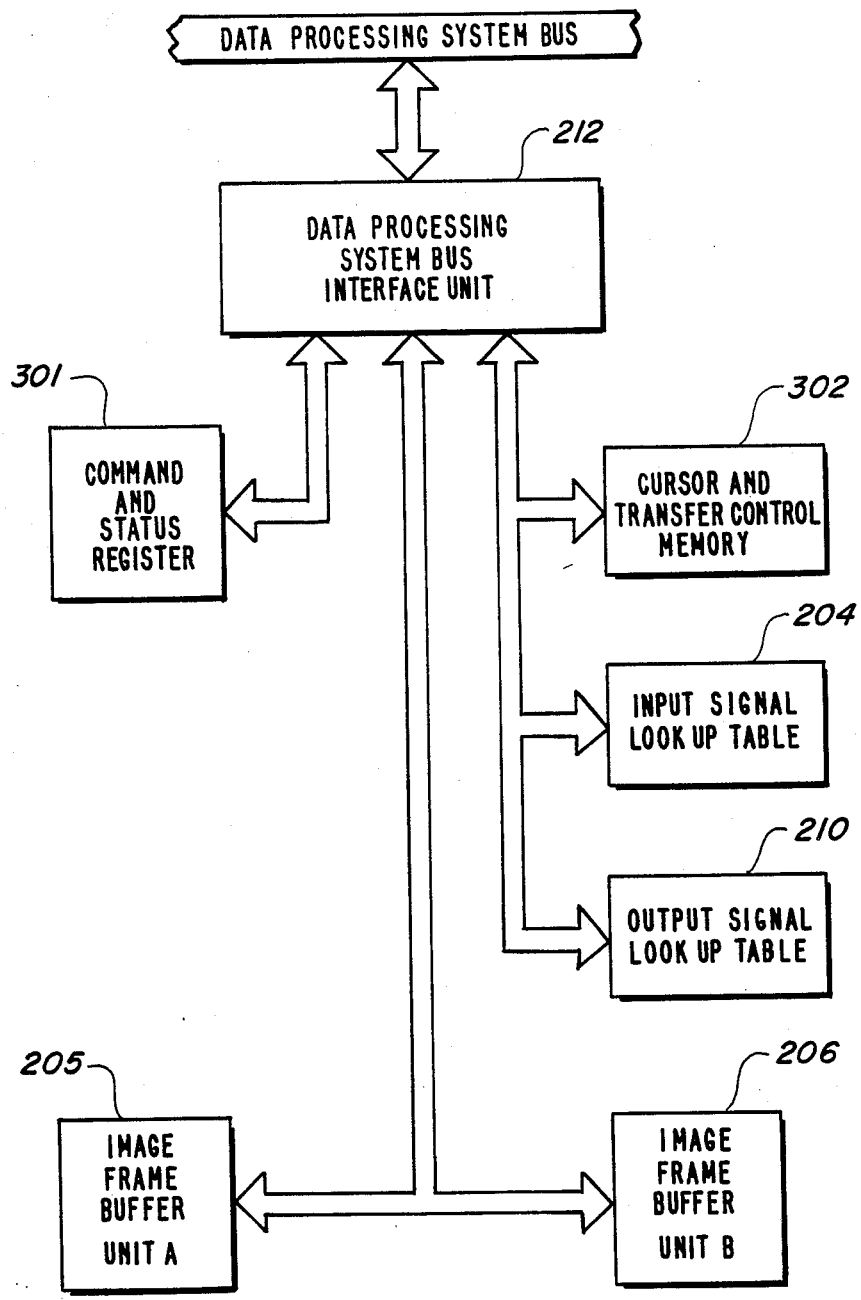
FIG. 3 is a block diagram of control components of the present invention having access to the data processing system.

Referring next to FIG. 3, command and status registers 301 exchange control and status signals with the data processing system 220 via data processing system bus interface unit 212. Similarly, the cursor and transfer control memory 302, the unit controlling transfer of logic signal groups between the image frame buffer unit A 205 and the image frame buffer unit B 206, input signal look up table 204, and output signal look up table 210 exchange signals with the data processing system 220 via data processing system bus interface unit 212.

Figure 4A:
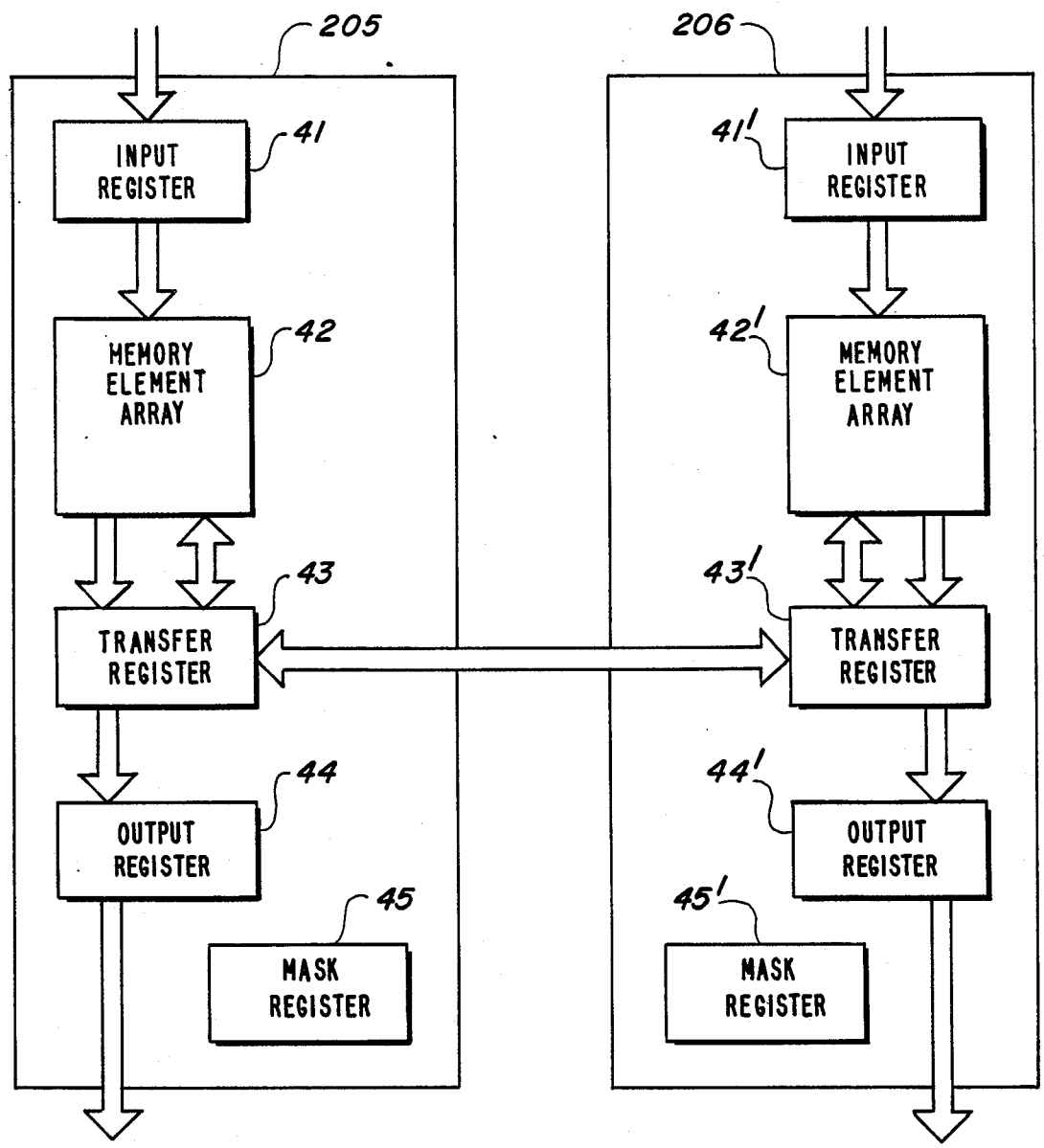
FIG. 4A is a block diagram of the components of the image frame buffer units.

Referring next to FIG. 4A, a block diagram of the two image frame buffer units 205 and 206 is shown. The pixel information is stored in the memory element arrays 42 and 42'. The pixel information (i.e., the parameters defining an image at a point) is entered into memory element array 42 and 42' via input registers 41 and 41', respectively, and removed from the memory element arrays via output registers 44 and 44', respectively. Coupled to memory element array 42 is transfer register 43, while transfer register 43' is coupled to memory element array 42'. Transfer register 43 is coupled to transfer register 43'. Transfer registers 43 and 43' are shift registers, however each transfer register is clocked by a separate clock. Mask registers 45 and 45' are available in image frame buffer 205 and image frame buffer 206. These mask registers can have signals from the data processing system stored therein.

Figure 4B:
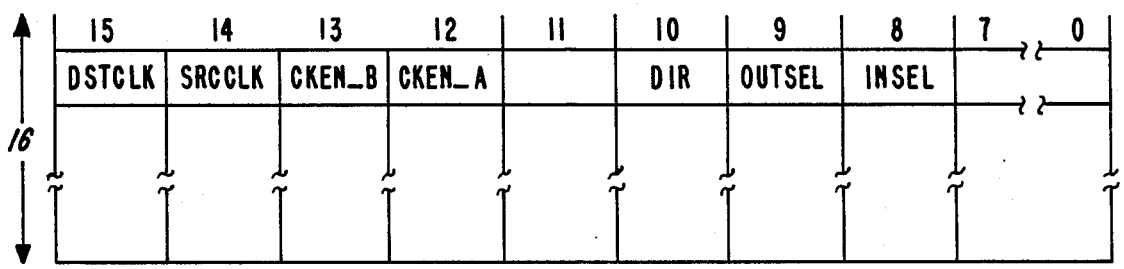
FIG. 4B is an illustration of the format of the transfer program words controlling the transfer of pixel information between the image frame buffer units.

Referring next to FIG. 4B, the format of the data groups controlling inter image frame buffer transfer is illustrated. Bit 0-7 positions (i.e., the low byte) contains the pixel clock count for which the signals are to be asserted. The bit 8 position (INSEL) is asserted low to select the A image frame buffer input signals and is asserted high to select the B image frame buffer input signals. The bit 9 position (OUTSEL) is asserted low to select the A image frame buffer output signals and is asserted high to select the B image frame buffer output signals. The bit 10 position (DIR), when asserted low enables the least significant line pixel to be connected to the corresponding register's most significant pixel and, when asserted high, the most significant line pixel will be connected to the corresponding register's least significant pixel, while reversing the normal shift direction of the transfer registers. The bit 11 position is not used in the present embodiment. The bit 12 position (CKENA) will allow clocking of the frame A transfer register 43. The bit 13 position (CKENA) will allow clocking of the frame B transfer register 43'. The bit 14 position (SRCCLK) will increment the source frame line counter on low to high transition of the pulse. And bit 15 position (DSTCLK) will increment the destination frame line counter on the low to high transition of the pulse.

Referring next to FIG. 5 the control status registers, accessible to the data processing system typically located in the command and status registers 301 and the cursor and control memory 302, are shown. The control status registers (CSR) include the following signal groups: Interrupt Control provides interrupt information to the data processing system, the Vector Address and the Hardware Configuration fields provide control information, the Mask Usage field designates how the mask fields are being used, the Cursor X, Cursor Y and Cursor Control control a cusor in the output video image, the Video Output Control controls features of the output video signal, the Static Output Alpha controls one of the alpha parameters, the Video Output Address controls options in the video output signal, the Video Input Control designates options in the video input signal, the Input Static Alpha controls a second alpha parameter, the Start Acquisition initiates unit activity, the Transfer Control and the Iteration Start provide control functions, the Source Address designates the line address of the signal origin of the pixel signals to be transferred and the Destination Address designates the line to which the addressed pixels are to be transferred.

Figure 6A:
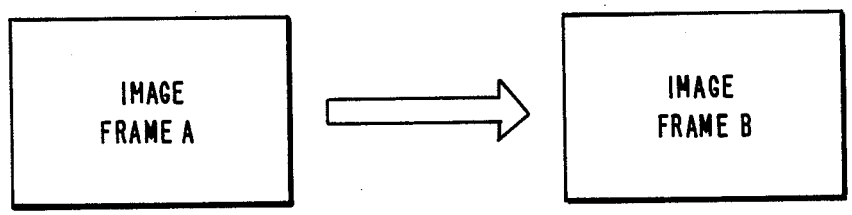
FIGS. 6A, 6B, 6C and 6D illustrate processing operations using the image frame buffer unit of the present invention.
Figure 6B:
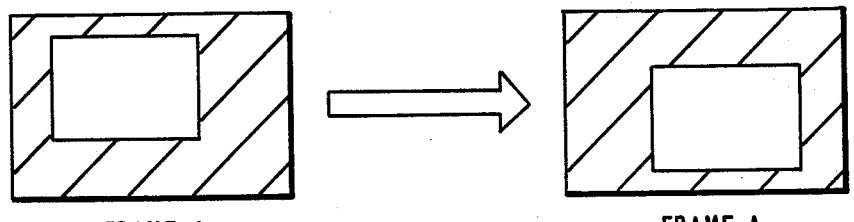
Figure 6C:
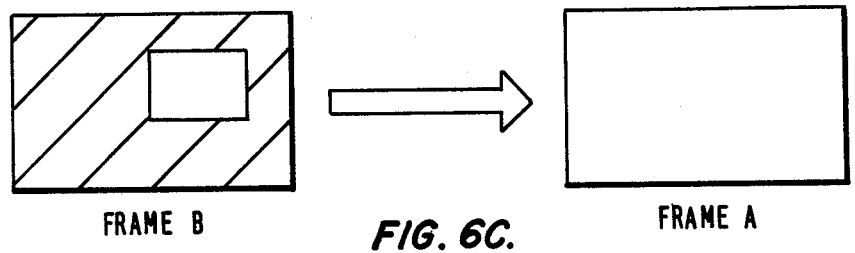
Figure 6D:
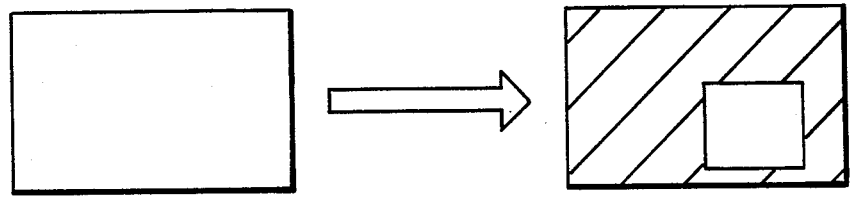

Referring to FIGS. 6A, 6B, 6C and 6D, various image processing operations capable of being executed by the present invention are illustrated. In FIG. 6A, an image in one frame can be transferred to the other frame. Because of the availability of the alpha parameters, an image can be captured and recombined with the video signal for "fade" or "dissolve" type image manipulation. Using the two frame buffers of the present invention, the image can be controllably moved or panned as illustrated in FIG. 6B. The ability to control the clocks separately for the two image frame buffers, as shown in FIGS. 6C and FIG. 6D, permit a portion of the image to be magnified, or permit the image to be condensed, or minified into a portion of the image.

Referring next to FIGS. 7A, 7B, 7C and 7D, the process by which an image (portion) is expanded in the horizontal dimension (FIG. 7A) and in the vertical dimension (FIG. 7C) or the image is minified, in the horizontal dimension or minified in the vertical direction is shown. In the horizontal direction, the magnification is achieved by repeating pixels A through N, each a predetermined number of times (three is illustrated), while to minify the image, a predetermined number of pixels are discarded periodically (every other pixel is disgarded in the illustration). The same process is used for the magnification of the image (repeating scan lines S and T three times) and minification of the image (disgarding scan lines between R and S and between S and T) in the vertical dimension.

2. Operation of the Preferred Embodiment

The image processing device of the present invention is designed to function under control of a data processing system. The data processing system bus interface unit 212 is coupled to the bus of the data processing system and must receive signals from the data processing system bus and apply signals to the data processing system bus in a format and protocol that is compatible with that of the system bus. In the referred embodiment, the clocks and gates are coupled to the associated registers and are activated by an appropriate gates and gating signals. This type of implementation is said to be "hardwired", however, it will be clear that other implemntations are possible.

The video signal input interface unit 201 accepts Red Green Blue (RGB) video input signals at 30 Hz frame rate in the interlaced mode. The interface unit can be adapted to accept a composite synchronization configuration or accept synchronization information from the green channel. In the interface unit 201, three 8-bit analog to digital converters generate 24 bits of color information for each pixel. The three analog to digital converters sample the input image signal at a maximum rate of 14.6 MHz. At this sampling rate, each non-blanked horizontal line image will be divided into 768 pixels. The video input signal interface unit includes a firmware program generator that permits the sampling of the non-blanked horizontal line into any number of pixels less than 768. This flexibility is available to allow adjustment of the video input signal interface unit to operate with a variety of aspect ratios (i.e., the ratio of an image length to an image width). The number of image scan (horizontal) lines can be programmed by the firmware apparatus to be 512 or any number less. Generally, the number of non-blanked scan lines is either 485 or 483, so that a multiplicity of unused lines are available for use as mask storage locations in each video image field.

The digitized data is applied to input signal multiplexer 202 that can select between the input video signals or the output signals from the output signal look up table 210. The input signal multiplexer 202 receives 32 bits of information per pixel location. This field includes 24 bits of RGB color information plus eight bits for intensity information, these eight bits generally referred to as the alpha channel. The alpha channel field is associated with the output image signals, but must be added (e.g., by means of a register value) to the pixel fields from the video signal input interface unit 201.

The input signal look-up table 204 is comprised of three tables of 256 entries, each entry being eight bits wide. When the input signal look up table is programmed on a one to one correspondence, then 24 bits of true color information will be applied from the input signal interface unit to the frame buffer memory units 205 and 206. The input signal look up table 204 can be controlled, by entry of appropriate data from the data processing system therein, to constrain each pixel to one of 16.7 million possible colors.

The frame buffer memory unit A 205 and frame buffer memory unit B 206 (FIG. 4A) are implemented by custom designed random access (RAM) memories. The individual shift registers storing the video signal image have each been dedicated to a specific channel. Register 44 is used for the output video image signals, while register 41 is used for the input video image signals. Register 43 is a bidirectional register and is used for high speed signal transfers between frame buffer memory unit A 205 and frame buffer memory unit B 206. In the preferred embodiment, all three registers are clocked independently and arbitration procedures must be employed to permit access to the image frame buffer unit 205 or 206. The transfer register 43 is not clocked by the system and is used for only temporary storage within the associated frame buffer memory unit. The mask register 45 can be programmed in conjunction with any of the array registers, however, the mask register can be accessed only by central processing unit bus interface unit 212. Therefore, only a single mask can be selected for simultaneous use by the three image frame buffer unit registers. The mask register 45 and an auxilliary register (not shown) can be controlled to access all frames simultaneously, or any combinatorial use of the video fields within each frame buffer memory unit.

In conjunction with the video signal input format, the output signal is fully programmable up to 768 dots horizontally and up to 512 lines vertically. According to one configuration, the image processing system can be programmed for 768 pixels per line and 483 lines while using a base clock frequency of 43.8 MHz. The selection of ratios requires a change in the crystal oscillator frequency as well as changes in the PROM controlling the sequencing of information. The output signal of the system is adapted to conform to the U.S. video standard of the 30 Hz interlaced display. For applications requiring a 4:3 aspect ratio, 647 pixels by 485 lines can be provided, reducing the base frequency to 36.9 MHz.

Because the memory access is also derived from the base (crystal) frequency, time to access the memory will be proportionately reduced. The additonal memory locations no longer used for scan storage purposes can be treated as icon space and can be programmed to exist on either side, or, on both sides of the horizontal scan storage locations.

During each (non-blanked) pixel clock period, two independent 32 bit pixels are produced, one from each frame. The two frames are scanned in an identical manner so that each pixel position in the frame has a one to one correspondence with the second frame buffer memory. The 32 bits of information include 8 bits for the red color information, 8 bits for the green color information, 8 bits for the blue color information and 8 bits for the alpha parameter.

The A multiplier unit 207 and the B multiplier unit 208 provide the mixing function for each image frame. For each pixel, each 8 bit color field is multiplied simultaneously by the 8 bit alpha field. When the alpha value is 255, the color information will pass through the multiplier unchanged, while the 0 alpha value will cause the color pixel information to be attenuated completely. The alpha value can be obtained from a value stored in the command and status registers 301. A register is provided in the command and status registers 301 for each image frame buffer unit 205 and 206. The 8 bit most significant product is applied to the arithmetic logic unit 209.

The two streams of data from the A multiply unit 207 and the B multiply unit 208 are combined in arithmetic logic unit 209. In the preferred embodiment, the available arithmetic and logic functions are determined by 3 bits of information and are:

0 Set to 0
1 A minus B
2 B minus A
3 A plus B
4 A x or B
5 A or B
6 A and B
7 Set to 1

The 24 bit pixel color information from the arithmetic logic unit 209 is applied to output signal look up table 210. It will be clear that, because the alpha parameters are under control of the data processing system, "fade" and "dissolve" image processing can be readily accomplished.

The output signal look up table 210 is identical in function to the input signal lookup table 204 and can transform any available color pixel from the arithmetic unit to any possible color pixel.

Figure 7A:
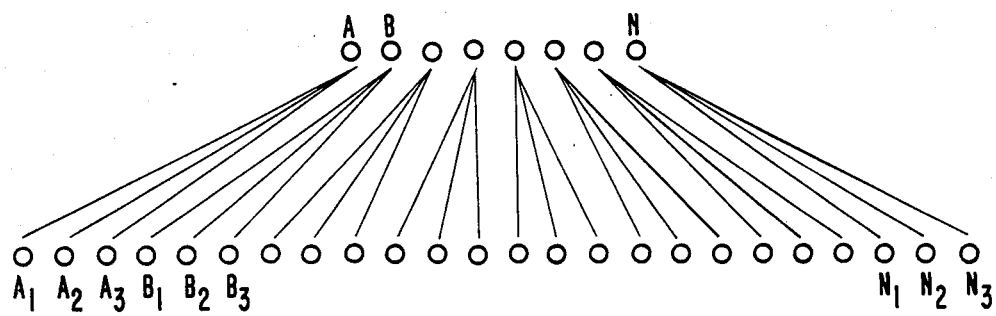
FIGS. 7A, 7B, 7C and 7D illustrate the process by which a pixel image can be magnified or can be minified using the techniques of the present invention.
Figure 7B:
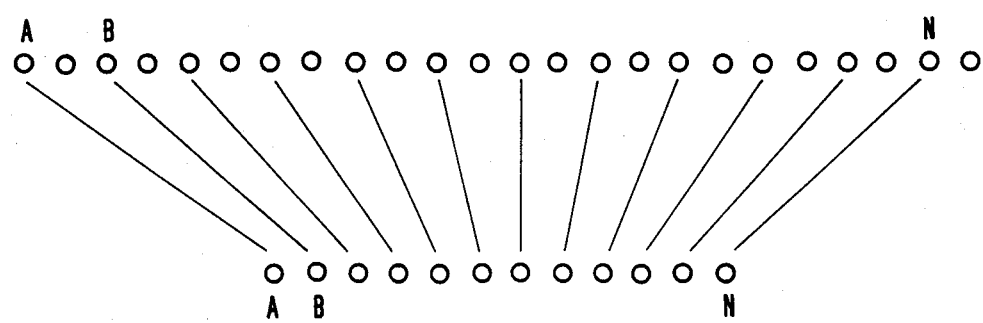
Figure 7C:
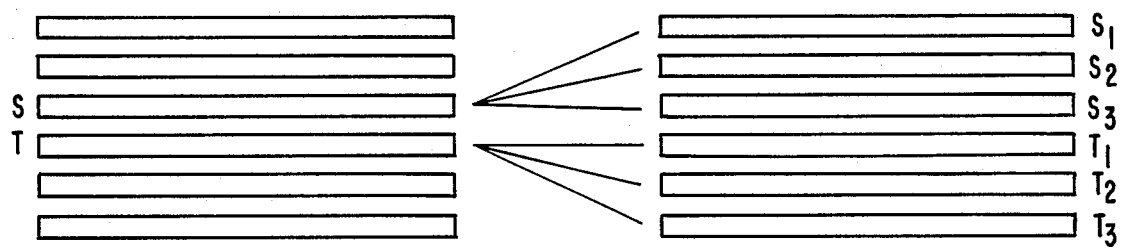
Figure 7D:
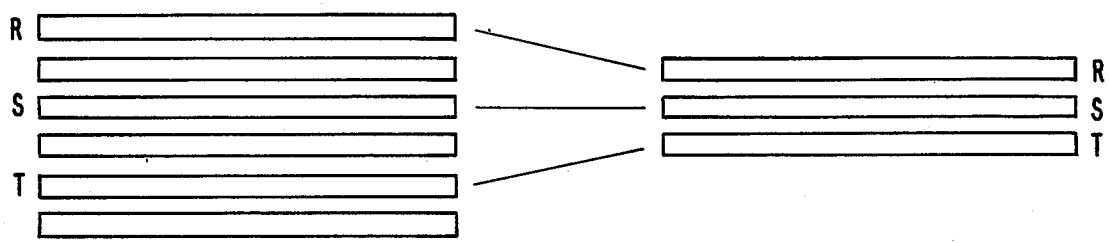

The processing function performed in the image frame buffer transfer can be understood in the following manner. In the preferred embodiment, the pixels are transferred one line at a time. The source address line and the destination address line for a transfer are given by the command and status registers (FIG. 5). The 16 transfer control fields each determine the manner in which the associated 16 pixels of the line will be transferred. In addition, the transfer registers for each one the image frame buffer units are clocked independently of the other image frame buffer units. To magnify a pixel line in the horizontal direction, the destination transfer register clock should provide three transfer register shifts for each source transfer register clock shifts (as in FIG. 7A). The rates of the transfer register clocks must be reversed to minify the pixel line (FIG. 7B). The magnification and minification of the horizontal image can be accomplished by the line addressing algorithm (FIGS. 7C and 7D).

Summarizing, the video signal processing unit of the present invention can process the image pixels of an array in several ways. The image frame buffer units can move and vary dimensions of pixel array. The arithmetic logic unit can combine the pixel arrays in a variety of logical manipulations. Finally, the alpha parameters can be controlled by the data processing system. Similarly, the pixel translation resulting from the look up tables is also subject to control by the data processing system. Finally, the data processing system can store an image, such as a logo, into the image frame buffer unit that can then be further processed by the video signal processing unit. In addition, the pixels in the image frame buffer units are not destroyed by the combining process and can therefore be used for further pixel processing.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A video signal processing unit responsive to signals from a data processing unit, said video image processing unit processing input video image signals to provide a preselected output video image signals, said video signal processing unit comprising:

register means for storing said signals from said data processing unit;
  first image frame buffer means for storing video image signals;
  second image frame buffer means for storing video image signals, at least one of said image frame buffer means coupled to an input terminal, said input terminal having said input video image signals applied thereto;
  transfer means for transferring video image signals between said first image frame buffer means and said second image frame buffer means in response to said data processing signals; and
  combining means for combining video image signals in said first image frame buffer means and said second image frame buffer means.

2. The video image processing unit of claim 1 wherein video image signals stored in said first and second image frame buffer means include alpha parameter signals, said alpha parameter signals designating an intensity for associated video image signals.

3. The video image processing unit of claim 2 wherein said combining means provides a logical combination of said video image signals of said first and said second image frame buffer means determined by said alpha parameters at each image pixel.

4. The video image processing unit of claim 1 wherein said transfer means includes location control means for controlling a pixel location address in a one of said image frame buffer means and for controlling a pixel destination location in a second of said image frame buffer means.

5. The video image processing unit of claim 4 wherein said transfer means includes clocking means for controlling a rate at which pixel information is transferred from said one image frame buffer means and a second rate at which said pixel information is transferred to said second image frame buffer means.

6. The video image processing unit of claim 5 further including translation means for controlling color parameters of said video output signal.

7. The video image processing unit of claim 5 wherein said transfer means transfers an image between said image frame buffer means one line per operation.

8. The video image processing unit of claim 7 wherein an image in one of said image frame buffer means can be scrolled or shifted.

9. The video image processing unit of claim 7 wherein a transfer of an image from said one image frame buffer means to said second image frame buffer means can cause said image to pan, to be enlarged or to be diminished.

10. A method for processing digitized input video signals comprising the steps of:
    storing said input video signals in a first image frame buffer;
    transferring said first image frame buffer stored signals into different locations in a second image frame buffer in response to first control signals; and
    combining said first image frame buffer stored signals and said second image frame stored signals in response to second control signals.

11. The method for processing digitized input signals of claim 10 wherein said transferring step includes the step of transferring said stored video signals one line at a time.

12. The method for processing digitized input video signals of claim 11 wherein said transferring step includes specifying a source line and a destination line.

13. The method for processing digitized input video signals of claim 12 wherein said transferring step includes specifying a first clock rate for said transferring said stored signals from said first image frame buffer and a second clock rate for storing said stored signals into said second image frame buffer.

14. The method for processing digitized input video signal of claim 13 wherein said combining step includes combining said image frame buffer stored signals with an arithmetic operation.

15. The method for processing digitized input video signals of claim 14 further comprising the step of controlling an intensity for each image frame buffer.

16. Apparatus for processing input video signals comprising:
    first image frame buffer means for storing an array of pixels associated with an image represented by said input video signals;
    second image frame buffer means for receiving pixels transferred from said first image buffer means and for storing said pixels in a controllable prearranged relationship different from said array of pixels; and
    combining means for combining pixels stored in said first image frame buffer means with pixels stored in corresponding locations in said second image frame buffer means.

17. The video signal processing apparatus of claim 16 wherein said prearranged relationship includes specifying a source pixel line in said first image frame buffer means and a designation pixel line in said second image frame buffer means, said prearranged relationship further including specifying a first clock period for said first image frame buffer means and a second clock period for said second image frame buffer means.

18. The video signal processing apparatus of claim 17 further including means for controlling pixel intensity parameters in said first and said second image frame buffer means.

19. The video signal processing apparatus of claim 16 wherein said combining means includes an arithmetic logic unit for combining said pixels in a preselected manner.

20. The video signal processing apparatus of claim 16 further comprising means for storing a selected image in said second image frame buffer means.

* * * * *